US010737962B2

(12) United States Patent
Coppola et al.

(10) Patent No.: US 10,737,962 B2
(45) Date of Patent: Aug. 11, 2020

(54) SYSTEM FOR FORMING A GLASS ARTICLE

(71) Applicant: Corning Incorporated, Corning, NY (US)

(72) Inventors: Frank Coppola, Horseheads, NY (US); John Michael Feenaughty, Arkport, NY (US); Vladislav Yuryevich Golyatin, Avon (FR); John Jerry Kersting, Painted Post, NY (US); Steven Michael Milillo, State College, PA (US); Eric James Nichols, Corning, NY (US); Nikolay Anatolyevich Panin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 287 days.

(21) Appl. No.: 15/548,596

(22) PCT Filed: Feb. 3, 2016

(86) PCT No.: PCT/US2016/016259
§ 371 (c)(1),
(2) Date: Aug. 3, 2017

(87) PCT Pub. No.: WO2016/126752
PCT Pub. Date: Aug. 11, 2016

(65) Prior Publication Data
US 2018/0044215 A1 Feb. 15, 2018

Related U.S. Application Data

(60) Provisional application No. 62/111,954, filed on Feb. 4, 2015.

(51) Int. Cl.
*C03B 17/06* (2006.01)

(52) U.S. Cl.
CPC .......... *C03B 17/064* (2013.01); *C03B 17/065* (2013.01)

(58) Field of Classification Search
CPC ..... C03B 17/00; C03B 17/064; C03B 17/065; C03B 23/0235; C03B 23/023; C03B 13/10
See application file for complete search history.

(56) References Cited

U.S. PATENT DOCUMENTS 1,772,448 A     8/1930   Allen
3,607,182 A *   9/1971   Leibowitz ............. C03B 17/064
                                                              65/53

(Continued)

FOREIGN PATENT DOCUMENTS

CN     101277799 A    10/2008
CN     101381199 A     3/2009
(Continued)

OTHER PUBLICATIONS

English translation for JP2006298736 (Year: 2006).*
(Continued)

*Primary Examiner* — Joseph S Del Sole
*Assistant Examiner* — Mohamed K Ahmed Ali
(74) *Attorney, Agent, or Firm* — Michael A. Hood; Svetlana Z. Short

(57) ABSTRACT

A system includes an overflow distributor and a support member. The overflow distributor includes a first sidewall, a second sidewall opposite the first sidewall, and a floor extending between the opposing first and second sidewalls. Interior surfaces of the first sidewall, the second sidewall, and the floor cooperatively define a trough configured to receive molten glass. Exterior surfaces of the first sidewall and the second sidewall are configured to direct molten glass that overflows the trough. The support member is disposed (Continued)

between the opposing first and second sidewalls of the overflow distributor and abutting an exterior surface of the floor of the overflow distributor.

18 Claims, 18 Drawing Sheets

(56) References Cited

U.S. PATENT DOCUMENTS

| | | | |
|---|---|---|---|
| 3,737,294 | A | 6/1973 | Dumbaugh, Jr. |
| 3,746,526 | A | 7/1973 | Giffon |
| 3,849,097 | A | 11/1974 | Giffen et al. |
| 3,931,438 | A | 1/1976 | Beall et al. |
| 4,102,664 | A | 7/1978 | Dumbaugh, Jr. |
| 4,204,027 | A | 5/1980 | Simon |
| 4,214,886 | A | 7/1980 | Shay et al. |
| 4,824,457 | A | 4/1989 | Jensen |
| 5,342,426 | A | 8/1994 | Dumbaugh, Jr. |
| 5,559,060 | A | 9/1996 | Dumbaugh, Jr. et al. |
| 7,201,965 | B2 | 4/2007 | Gulati et al. |
| 7,259,119 | B2 | 8/2007 | Helfinstine et al. |
| 7,514,149 | B2 | 4/2009 | Bocko et al. |
| 7,958,748 | B2 | 6/2011 | Hoysan |
| 8,007,913 | B2 | 8/2011 | Coppola et al. |
| 8,033,137 | B2 | 10/2011 | Hoysan et al. |
| 8,322,161 | B2 | 12/2012 | Nishiura et al. |
| 9,573,835 | B2 | 2/2017 | Markham et al. |
| 2014/0318182 | A1 | 10/2014 | Coppola et al. |

FOREIGN PATENT DOCUMENTS

| | | | | |
|---|---|---|---|---|
| CN | 202297351 | U | 7/2012 | |
| JP | 11246230 | A | 9/1999 | |
| JP | 3837729 | B2 * | 10/2006 | ........... C03B 17/064 |
| JP | 03837729 | B2 | 10/2006 | |
| JP | 2006298736 | A | 11/2006 | |
| JP | 2007197303 | A | 8/2007 | |
| JP | 2012501289 | A | 1/2012 | |
| WO | 2009020011 | A1 | 2/2009 | |
| WO | 2014085449 | A1 | 6/2014 | |

OTHER PUBLICATIONS

International Search Report and Written Opinion of the International Searching Authority; PCT/US2016/016259; dated May 11, 2016; 14 Pages; European Patent Office.

Chinese Patent Application No. 201680019822.1; English Translation of the First Office Action dated Aug. 5, 201; 10 Pgs; China Patent Office.

Japanese Patent Application No. 2017541021; Machine Translation of the Office Action dated Jan. 29, 2020; Japan Patent Office; 5 Pgs.

* cited by examiner

SYSTEM FOR FORMING A GLASS ARTICLE

This application claims the benefit of priority to International Application No. PCT/US2016/016259, filed on Feb. 3, 2016, which claims the benefit of priority to U.S. Application No. 62/111,954, filed on Feb. 4, 2015, the content of each of which is incorporated herein by reference in its entirety.

BACKGROUND

1. Field

This disclosure relates to systems for forming glass articles, and more particularly to fusion draw systems for forming glass sheets, such as laminated glass sheets.

2. Technical Background

Glass sheets can be formed using an isopipe as part of a fusion draw process. Molten glass overflows opposing weirs of the isopipe, forming two sheets of molten glass that flow down outer surfaces of the isopipe and rejoin at the bottom or root of the isopipe where the two sheets are fused together to form a single sheet of glass. The single sheet of glass is drawn downward away from the isopipe.

Multilayer glass sheets can be formed using two or more isopipes positioned at different elevations so that the sheets of molten glass flowing from an upper isopipe contact the sheets of molten glass flowing down a lower isopipe.

The dimensional stability of the isopipe during the glass forming process can affect the quality of the glass sheets manufactured using the isopipe. At high temperatures associated with molten glass, the isopipe can tend to deform or sag under its own weight and the weight of the molten glass contained in the isopipe.

SUMMARY

Disclosed herein are systems for forming a glass article.

Disclosed herein is an exemplary system comprising an overflow distributor and a support member. The overflow distributor comprises a first sidewall, a second sidewall opposite the first sidewall, and a floor extending between the opposing first and second sidewalls. Interior surfaces of the first sidewall, the second sidewall, and the floor cooperatively define a trough configured to receive molten glass. Exterior surfaces of the first sidewall and the second sidewall are configured to direct molten glass that overflows the trough. The support member is disposed between the opposing first and second sidewalls of the overflow distributor and abutting an exterior surface of the floor of the overflow distributor.

Disclosed herein is a system comprising an overflow distributor and a support member. The overflow distributor comprises a first sidewall, a second sidewall opposite the first sidewall, and a floor disposed between the opposing first and second sidewalls. A trough is disposed above the floor and between the opposing first and second sidewalls. The trough extends in a transverse direction within the overflow distributor. A cavity is disposed beneath the floor. The cavity extends in the transverse direction within the overflow distributor. The trough and the cavity are separated by the floor. The support member is disposed within the cavity.

Disclosed herein is a system comprising an upper overflow distributor, a lower overflow distributor, and a support member. The upper overflow distributor comprises a first sidewall, a second sidewall opposite the first sidewall, and a floor disposed between the opposing first and second sidewalls. A trough is disposed above the floor and between the opposing first and second sidewalls and extends in a transverse direction within the upper overflow distributor. A cavity is disposed beneath the floor and between the opposing first and second sidewalls and extends in the transverse direction within the upper overflow distributor. The trough and the cavity are separated by the floor of the upper overflow distributor. The lower overflow distributor is disposed beneath the upper overflow distributor and comprises a first sidewall, a second sidewall opposite the first sidewall. A trough disposed between the opposing first and second sidewalls and extends in the transverse direction within the lower overflow distributor. The opposing first and second sidewalls of the lower overflow distributor converge at a draw line disposed beneath the trough of the lower overflow distributor. The support member is disposed within the cavity of the upper overflow distributor.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
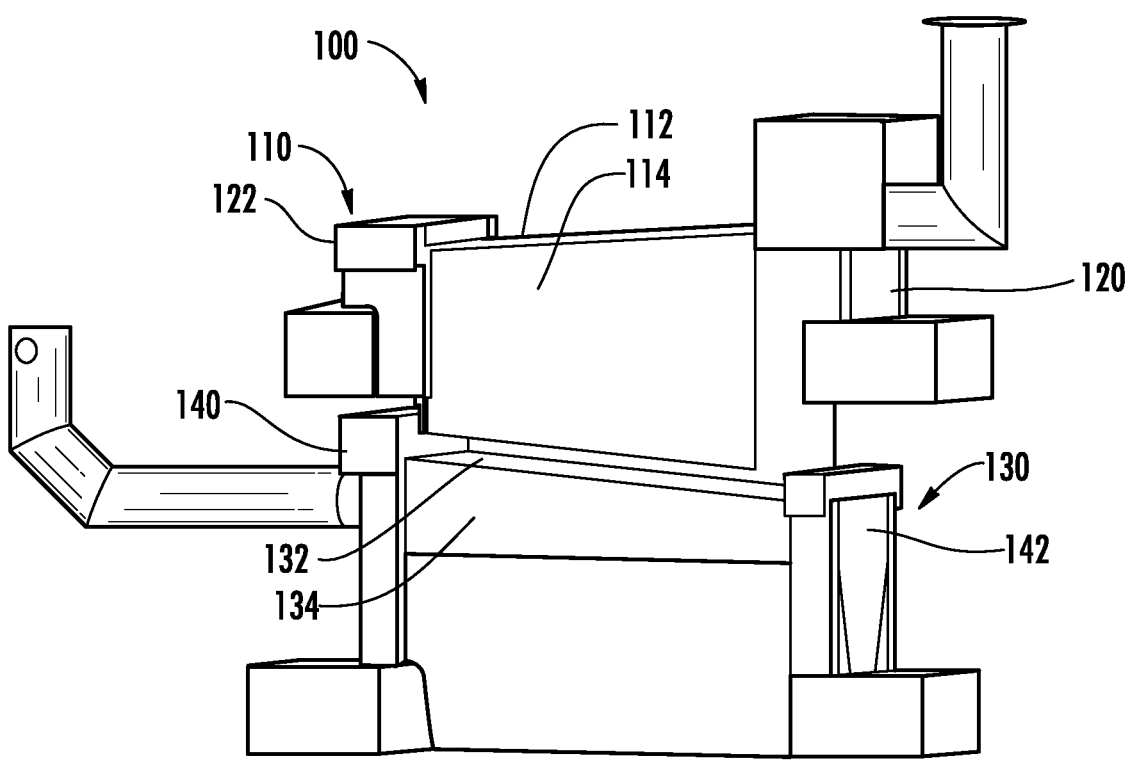
FIG. 1 is a perspective view of one exemplary embodiment of a system for forming a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Figure 2:
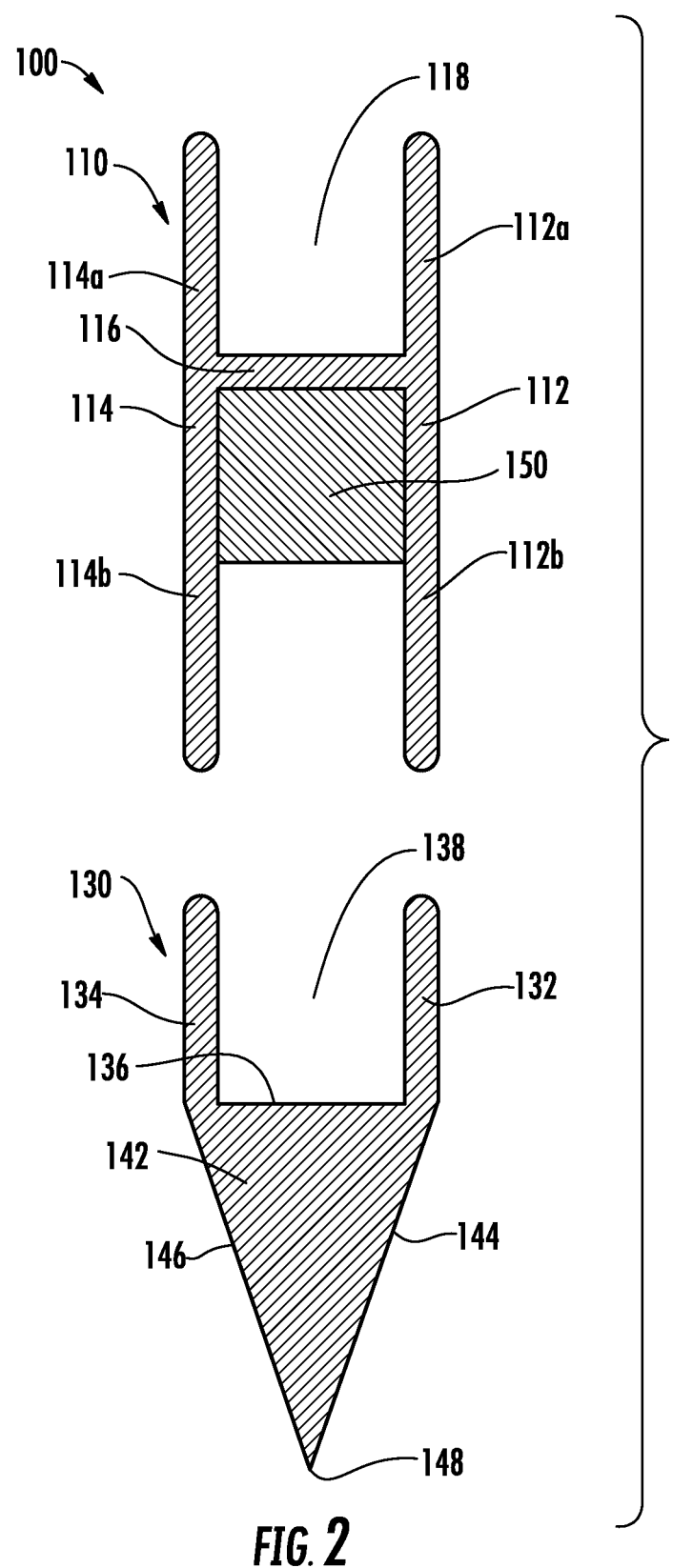
FIG. 2 is a schematic cross-sectional view of the system shown in FIG. 1.

FIG. 1 is a perspective view of one exemplary embodiment of a system 100 for forming a glass article, and FIG. 2 is a schematic cross-sectional view of the system. In the embodiment shown in FIGS. 1-2, system 100 comprises a first overflow distributor or isopipe 110 and a second overflow distributor or isopipe 130. First overflow distributor 110 comprises a first sidewall 112, a second sidewall 114 opposite the first sidewall, and a floor 116 extending between the opposing first and second sidewalls. In some embodiments, first sidewall 112 comprises an upper portion 112a and a lower portion 112b extending from the upper portion. Similarly, second sidewall 114 comprises an upper portion 114a and a lower portion 114b extending from the upper portion. In such embodiments, upper portions 112a and 114a of first and second sidewalls 112 and 114 are disposed or extend above floor 116, and lower portions 112b and 114b are disposed or extend below the floor. In some embodiments, upper portion 112a of first sidewall 112 is substantially parallel to upper portion 114a of second sidewall 114 and/or lower portion 112b of the first sidewall is substantially parallel to lower portion 114b of the second sidewall. Interior surfaces of first sidewall 112 (e.g., upper portion 112a), second sidewall 114 (e.g., upper portion 114a), and floor 116 cooperatively define a trough 118 extending in a transverse direction within first overflow distributor 110 between a first end or inlet end 120 and a second end 122 opposite the first end. In some embodiments, first overflow distributor 110 comprises an end dam (not shown) at first end 120 and/or second end 122. Thus, trough 118 can be defined by opposing first and second sidewalls 112 and 114, floor 116, and the opposing end dams. Trough 118 is configured to receive molten glass to form the glass article as described herein. Exterior surfaces of first sidewall 112 and second sidewall 114 are configured to direct molten glass that overflows trough 118 as described herein.

In the embodiments shown in FIGS. 1-2, second overflow distributor 130 comprises a first sidewall 132, a second sidewall 134 opposite the first sidewall, and a floor 136 extending between the opposing first and second sidewalls. In some embodiments, first and second sidewalls 132 and 134 are disposed or extend above floor 136. Additionally, or alternatively, first sidewall 132 is substantially parallel to second sidewall 134. Interior surfaces of first sidewall 132, second sidewall 134, and floor 136 cooperatively define a trough 138 extending in a transverse direction within second overflow distributor 130 between a first end or inlet end 140 and a second end 142 opposite the first end. In some embodiments, second overflow distributor 130 comprises an end dam (not shown) at first end 140 and/or second end 142. Thus, trough 138 can be defined by opposing first and second sidewalls 132 and 134, floor 136, and the opposing end dams. Trough 138 is configured to receive molten glass to form the glass article as described herein.

In some embodiments, second overflow distributor 130 comprises a forming portion 142 disposed beneath floor 136 as shown in FIGS. 1-2. Forming portion 142 comprises a first forming surface 144 and a second forming surface 146. First forming surface 144 extends from or is contiguous with an exterior surface of first sidewall 132. Additionally, or alternatively, second forming surface 146 extends from or is contiguous with an exterior surface of second sidewall 134. First and second forming surfaces 144 and 146 converge at a draw line 148. For example, forming portion 142 comprises a wedge, an upper surface of which defines floor 136 as shown in FIG. 2. The exterior surfaces of first sidewall 132 and second sidewall 134 are configured to direct molten glass that overflows trough 138 as described herein. First forming surface 144 and second forming surface 146 of forming portion 142 are configured to direct molten glass that overflows trough 138 as described herein.

In various embodiments, first overflow distributor 110 comprises a refractory body. Additionally, or alternatively, second overflow distributor 130 comprises a refractory body. For example, first overflow distributor 110 and/or second overflow distributor comprises a unitary body of refractory material. Such a refractory body can be formed using the materials described in U.S. Pat. Nos. 7,259,119; 7,958,748; or 8,033,137; each of which is incorporated by reference herein in its entirety. For example, such a refractory body can comprise zirconium (e.g., $ZrO_2$, $ZrO_2$ and $SiO_2$, or $ZrSiO_4$). Such refractory bodies can creep at high temperatures associated with forming glass articles. For example, molten glass can have a temperature of 1200° C. or greater. At such temperatures, an overflow distributor can tend to sag or bend under its own weight and/or the weight of the glass contained therein. Such sagging can cause irreversible shape change in the overflow distributor, which can change the flow profile of glass and render the overflow distributor unsuitable for continued use.

In a conventional single-layer fusion draw apparatus, the isopipe is supported using a compression system that applies an inward force from opposing ends of the isopipe. An example of such a compression system is described in U.S. Pat. No. 7,958,748. However, in system 100 described herein, there may be insufficient space between first overflow distributor 110 and second overflow distributor 130 to effectively use a conventional compression system to support the first overflow distributor.

Figure 3:
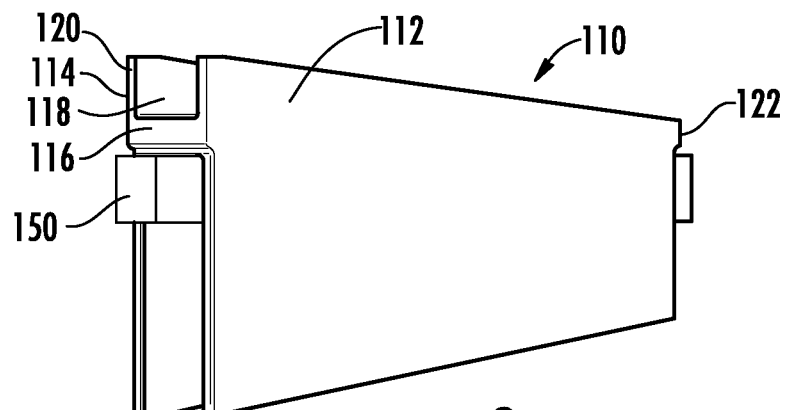
FIG. 3 is a partial perspective view of the system shown in FIG. 1.
Figure 4:
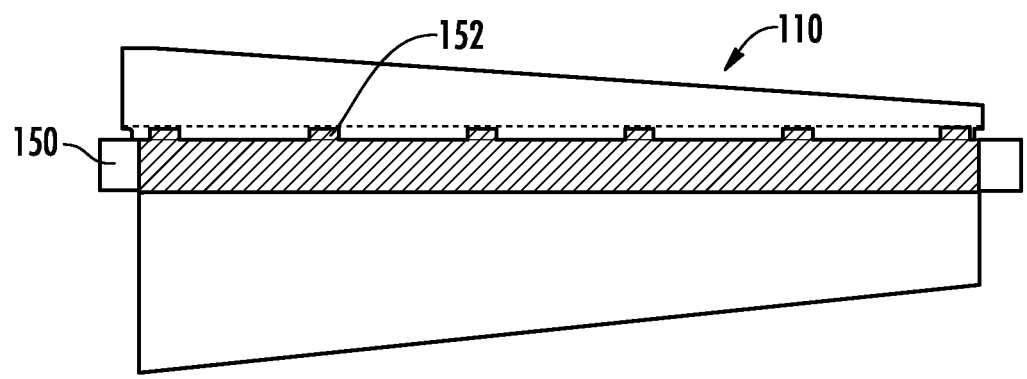
FIG. 4 is a partial front view of the system shown in FIG. 1.

FIG. 3 is a partial perspective view of system 100, and FIG. 4 is a partial front view of the system. In some embodiments, system 100 comprises a support member 150 disposed between opposing first and second sidewalls 112 and 114 of first overflow distributor 110 and abutting an exterior surface of floor 116 of the first overflow distributor. Support member 150 comprises an elongate structure extending in the transverse direction. For example, support member 150 is configured as a beam extending in the transverse direction between first end 120 and second end 122 of first overflow distributor 110 as shown in FIGS. 3-4.

Support member 150 can help to provide structural support to first overflow distributor 110 to prevent sag as described herein.

Figure 5:
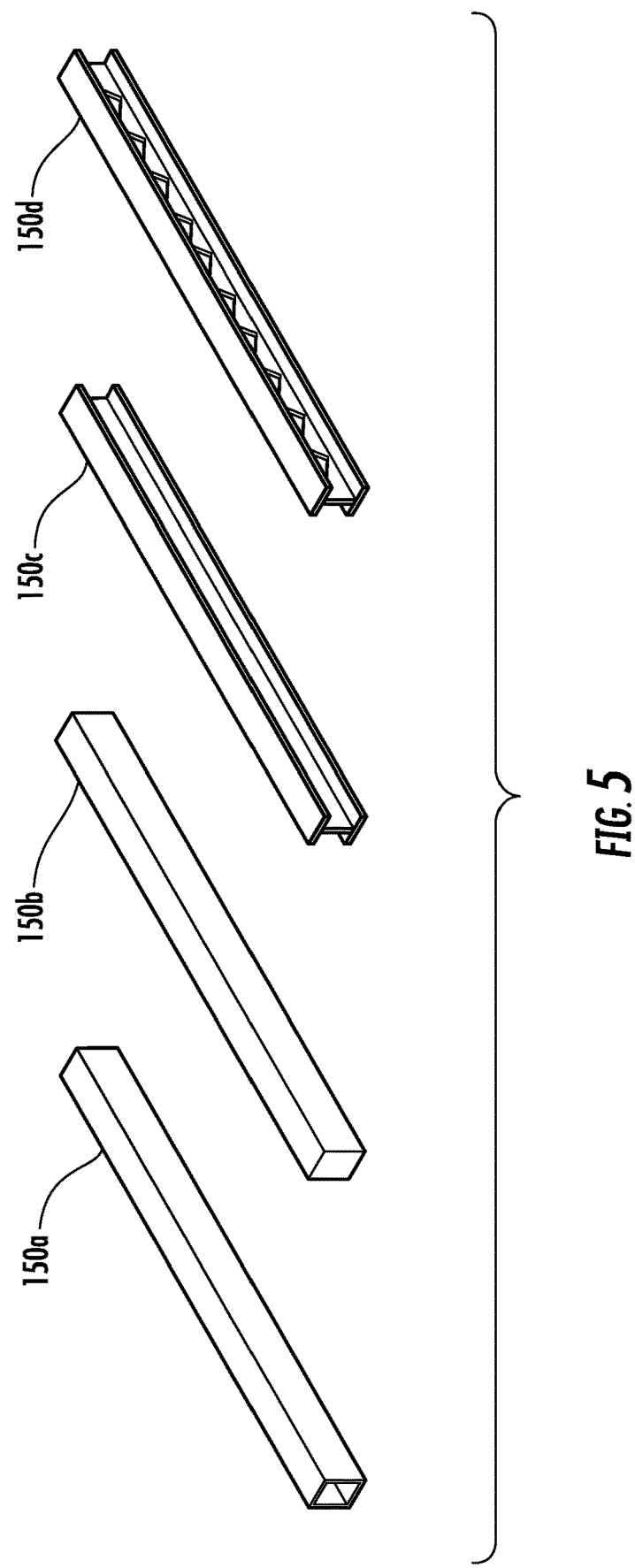
FIG. 5 is a perspective view of four exemplary embodiments of a support member.

FIG. 5 is a perspective view of four exemplary embodiments of support member 150, each configured as a different type of beam. For example, support member 150 can be configured as a hollow beam 150*a*, a solid beam 150*b*, an I-beam 150*c*, a perforated I-beam 150*d*, or another suitable type of beam. In various embodiments, support member 150 comprises a cross-sectional shape such as, for example, square, rectangular, circular, I-shaped, T-shaped, C-shaped, or another suitable shape.

In some embodiments, a length of support member 150 is greater than a width of first overflow distributor 110 such that opposing end portions of support member 150 extend in the transverse direction beyond the first overflow distributor as shown in FIGS. 3-4. Thus, the opposing end portions of support member 150 protrude from a cavity formed in first overflow distributor 110 between opposing first and second sidewalls 112 and 114 (e.g., lower portions 112*b* and 114*b*). The opposing end portions of support member 150 can be mounted on a support structure to support the weight of first overflow distributor 110. In some embodiments, the support structure can be mounted on second overflow distributor 130 or a support structure thereof. Such mounting can help to maintain a determined gap between the first overflow distributor and the second overflow distributor.

Although FIGS. 3-4 show support member 150 disposed within the cavity of first overflow distributor 110, other embodiments are included in this disclosure. In some embodiments, the second overflow distributor comprises a cavity extending in the transverse direction, and the support member is disposed within the cavity of the second overflow distributor to provide support to the second overflow distributor. For example, the cavity extends in the transverse direction through the forming portion of the second overflow distributor.

In some embodiments, the system comprises a single overflow distributor (e.g., the first overflow distributor or the second overflow distributor) and the support member. Thus, one of the first or second overflow distributors can be omitted. For example, the first overflow distributor can be omitted such that the system comprises the second overflow distributor and the support member disposed within a cavity in the forming portion of the second overflow distributor as described herein. In such embodiments, the overflow distributor can be used to form a single layer glass sheet.

The support member can provide sufficient support to mitigate deformation or sagging of the overflow distributor. Thus, in some embodiments, the system is free of a compression system. For example, no compressive force is applied in the transverse direction to the first end and/or the second end of the overflow distributor. The absence of the compressive force can reduce or eliminate a load bending moment on the overflow distributor, which can further mitigate deformation or sagging of the overflow distributor. Alternatively, in other embodiments, the support member can be used in combination with a compression system to cooperatively provide support to the overflow distributor.

In some embodiments, support member 150 is formed from a material configured to maintain its shape at the relatively high temperatures associated with handling molten glass. For example, support member 150 comprises α-SiC. Although α-SiC generally is incompatible with glass, the positioning of support member 150 beneath floor 118 of first overflow distributor 110 can protect the support member from contact with molten glass. Thus, in some embodiments, support member 150 is free of a cladding (e.g., a platinum cladding) intended to protect the support member (e.g., the α-SiC) from contact with molten glass.

In some embodiments, support member 150 comprises one or more protrusions 152 as shown in FIG. 4. For example, protrusions 152 extend from a surface of support member 150 toward the exterior surface of floor 118. Such protrusions can enable support member 150 to contact first overflow distributor 110 at determined points in the transverse direction.

Support member 150 can be beneficial compared to convention compression systems used for supporting isopipes. For example, a conventional compression system can exert an indeterminate or inconsistent force to the isopipe as a result of sample-to-sample difference in spring properties and/or force losses inside the fusion draw apparatus (e.g., due to friction and/or other factors). Since isopipe sag depends on the applied force, such uncertainties can lead to unexpected deformations of the isopipe. In contrast, support member 150 can enable a constant support force to be exerted on the overflow distributor. Additionally, the conventional compression system may require periodic adjustment of spring lengths to maintain a consistent compression force. In contrast, support member 150 can enable a constant support force to be exerted on the overflow distributor without periodic adjustment.

In some embodiments, support member 150 comprises a continuous beam. For example, support member 150 comprises a single beam that is free of joints. However, it may be difficult to form a continuous beam of sufficient length to serve as the support member.

Figure 6:
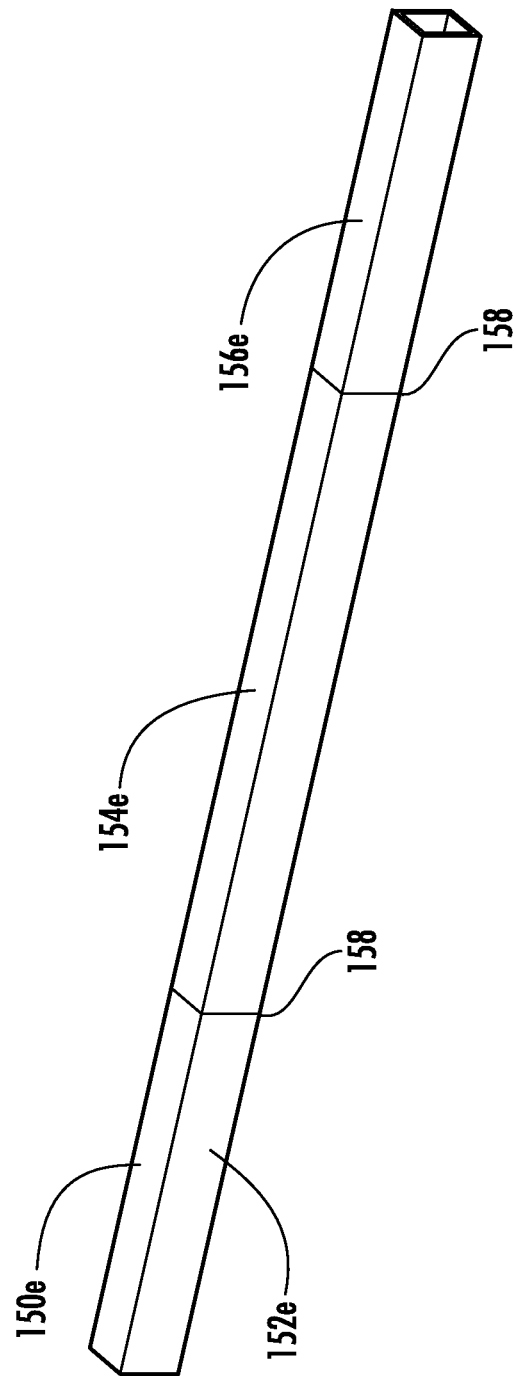
FIG. 6 is a perspective view of one exemplary embodiment of a support member.

In some embodiments, the support member comprises multiple beam segments bonded to one another. For example, FIG. 6 is a perspective view of one exemplary embodiment of support member 150*e* comprising three beam segments. A central beam segment 154*e* is bonded to each of two end beam segments 152*e* and 156*e* at a joint 158. In such embodiments, it can be beneficial for the central beam segment to be as long as possible to reduce the stress at the joints. Adjacent beam segments can be bonded, for example, by cementing, glass-ceramic adhesion, welding, transient liquid phase bonding, reaction bonding, active metal brazing, liquid phase joining or sintering, direct solid state diffusion bonding or sintering, and solid state diffusion bonding using a metal, ceramic, or organometallic interlayer, or another suitable ceramic bonding process.

Figure 7:
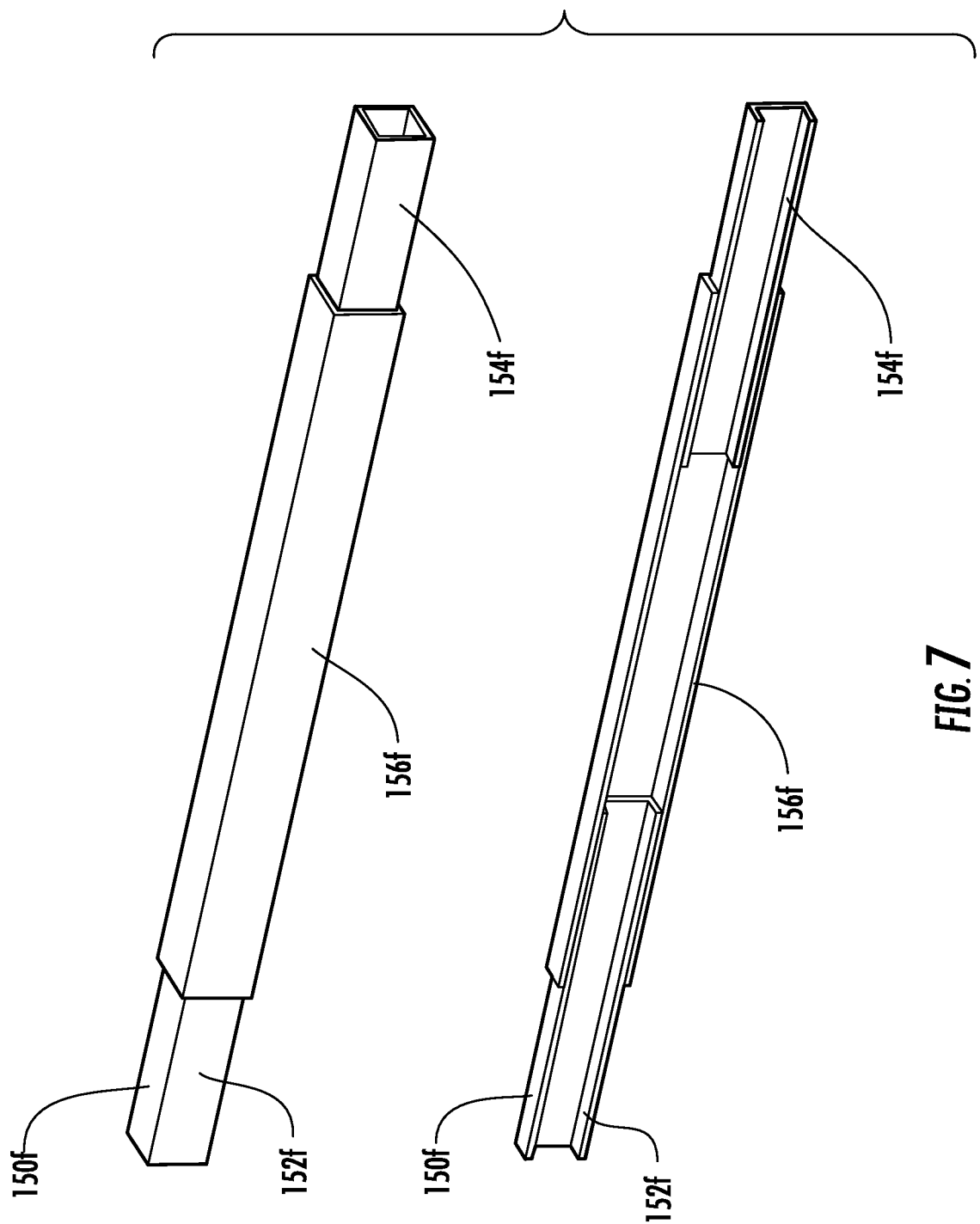
FIG. 7 shows perspective and cross-sectional views of one exemplary embodiment of a support member.
Figure 8:
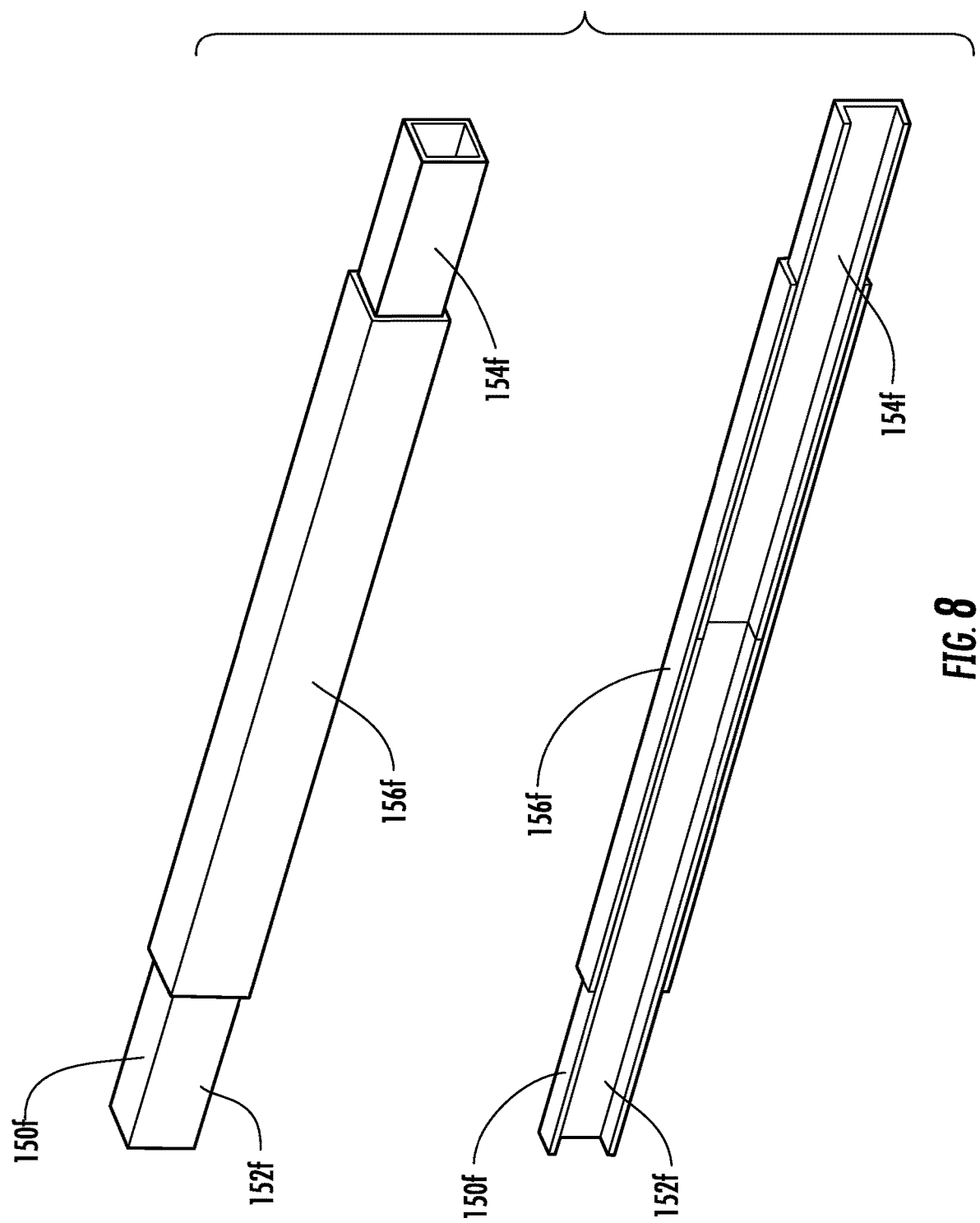
FIG. 8 shows perspective and cross-sectional views of one exemplary embodiment of a support member.
Figure 9:
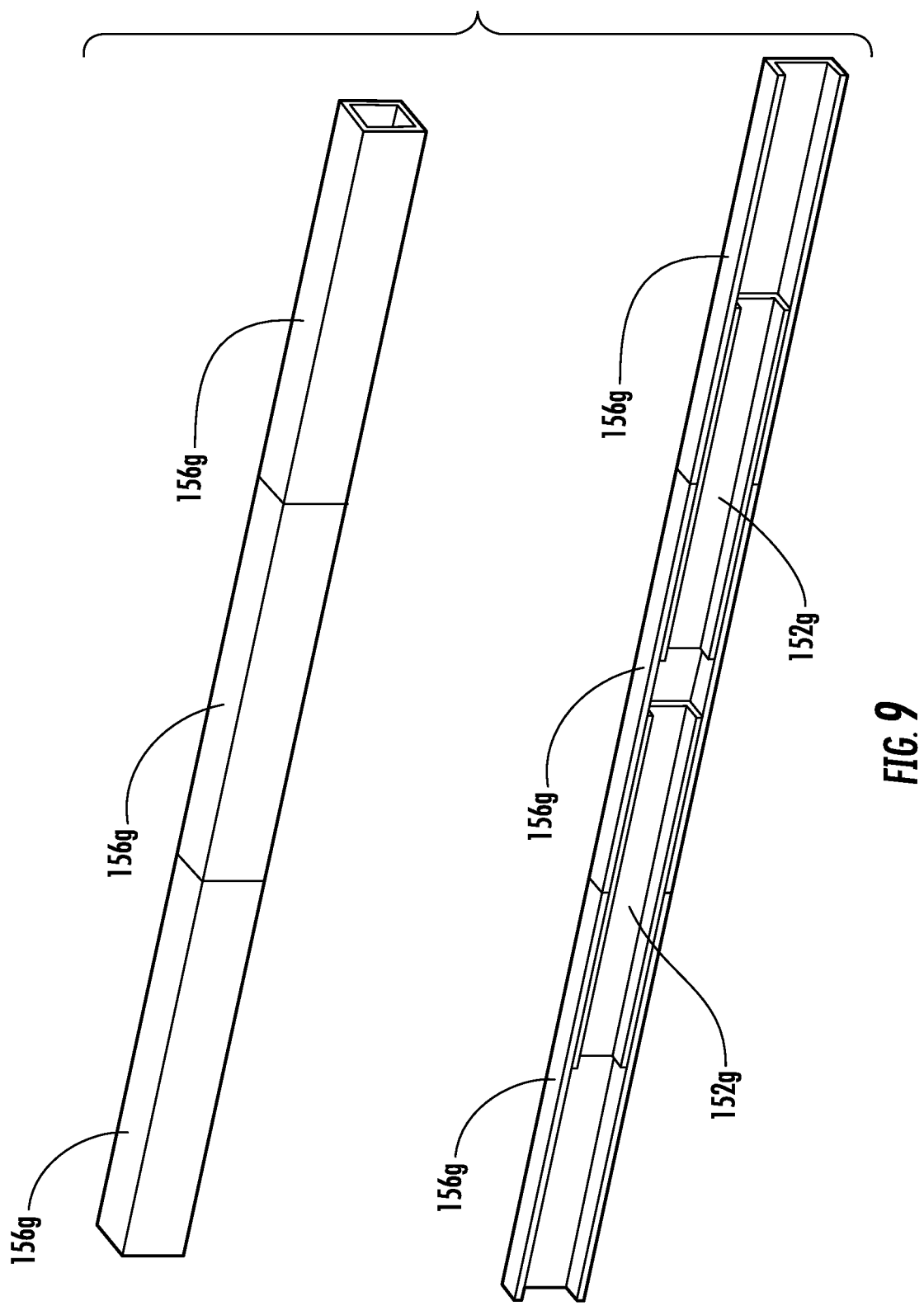
FIG. 9 shows perspective and cross-sectional views of one exemplary embodiment of a support member.
Figure 10:
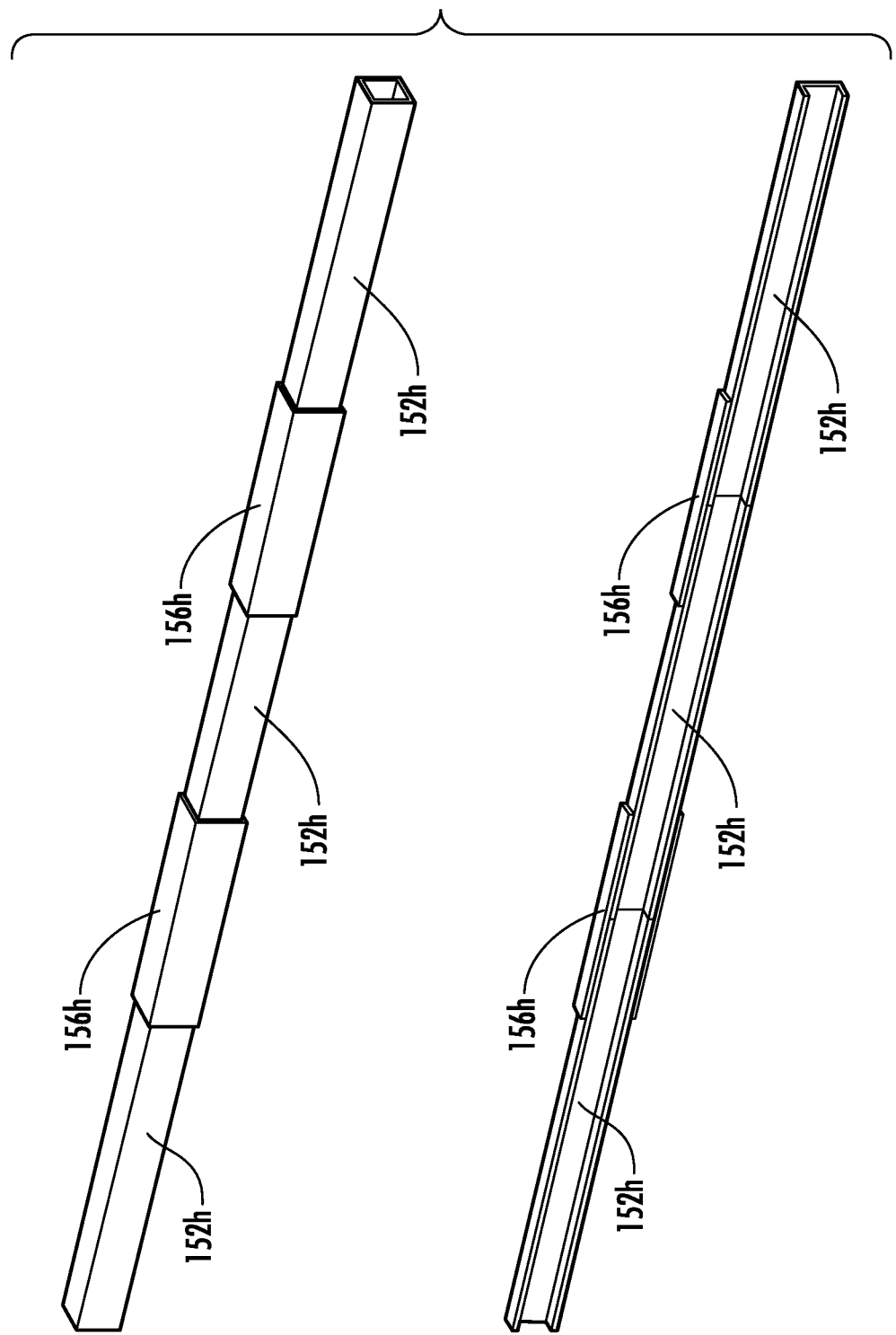
FIG. 10 shows perspective and cross-sectional views of one exemplary embodiment of a support member.

In some embodiments, the support member comprises multiple beam segments joined to one another by a beam sleeve. For example, FIG. 7 shows perspective and cross-sectional views of one exemplary embodiment of support member 150*f* comprising two end beam segments 152*f* and 154*f* joined to one another by a central beam sleeve 156*f*. The beam sleeve comprises a hollow beam segment with an inner dimension (e.g., an inner length, width, or diameter) that is greater than an outer dimension (e.g., an outer length, width, or diameter) of the end beam segments. Thus, the end beam segments can be disposed at least partially within the beam sleeve to join the end beam segments to one another. In some embodiments, adjacent ends of the end beam segments are spaced from one another within the beam sleeve as shown in FIG. 7. In other embodiments, adjacent ends of end beam segments 152*f* and 154*f* are abutting and/or joined to one another within beam sleeve 150*f* as shown in FIG. 8. In other embodiments, multiple beam sleeves 156*g* can be joined to one another by intermediate beam segments 152*g* as shown in FIG. 9. For example, adjacent beam sleeves are butted and/or jointed together and supported by inner beam segments. In other embodiments, joints between adjacent beam segments 152*h* are sheathed by beam sleeves 156*h* as shown in FIG. 10.

Figure 11:
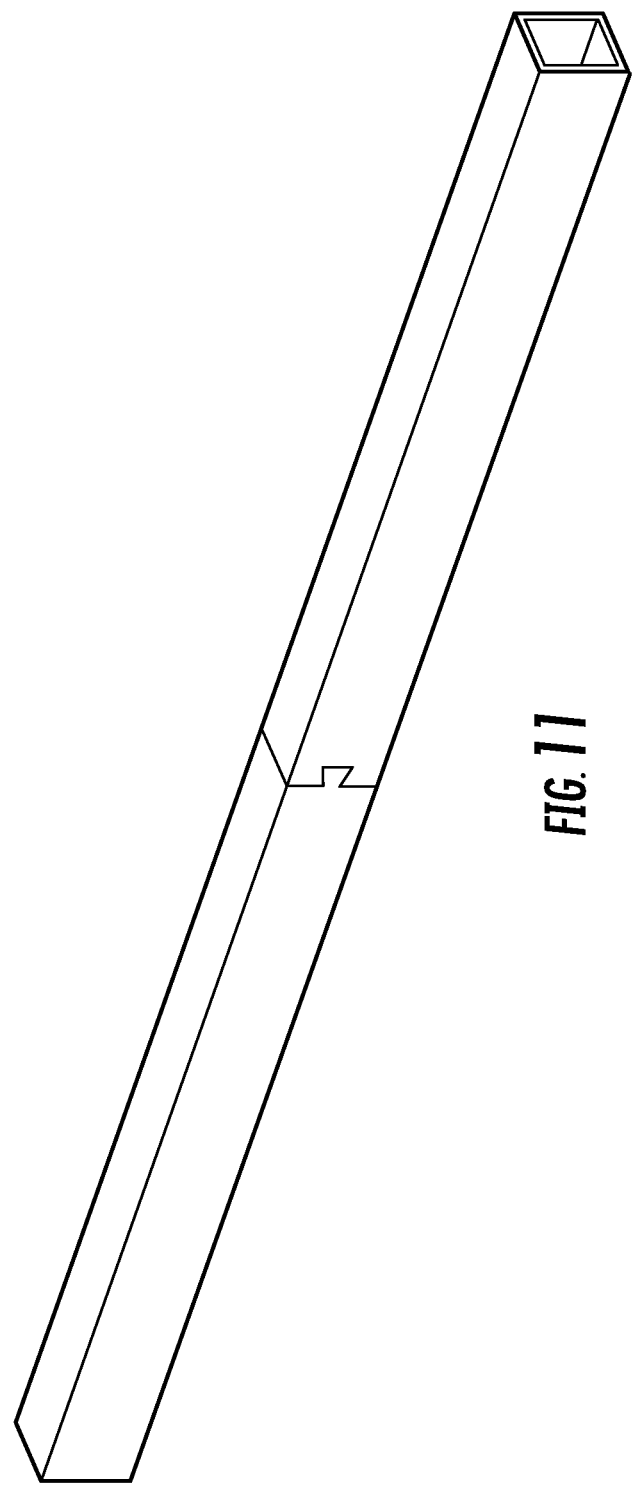
FIG. 11 is a perspective view of one exemplary embodiment of a support member.

In various embodiments, adjacent beam portions (e.g., beam segments, beam sleeves, end beam segments, and/or intermediate beam segments) can be joined to one another using an interlocking joint such as, for example, a dovetail joint as shown in FIG. 11, a T-slot joint, an L-slot joint, or another suitable joint.

Figure 12:
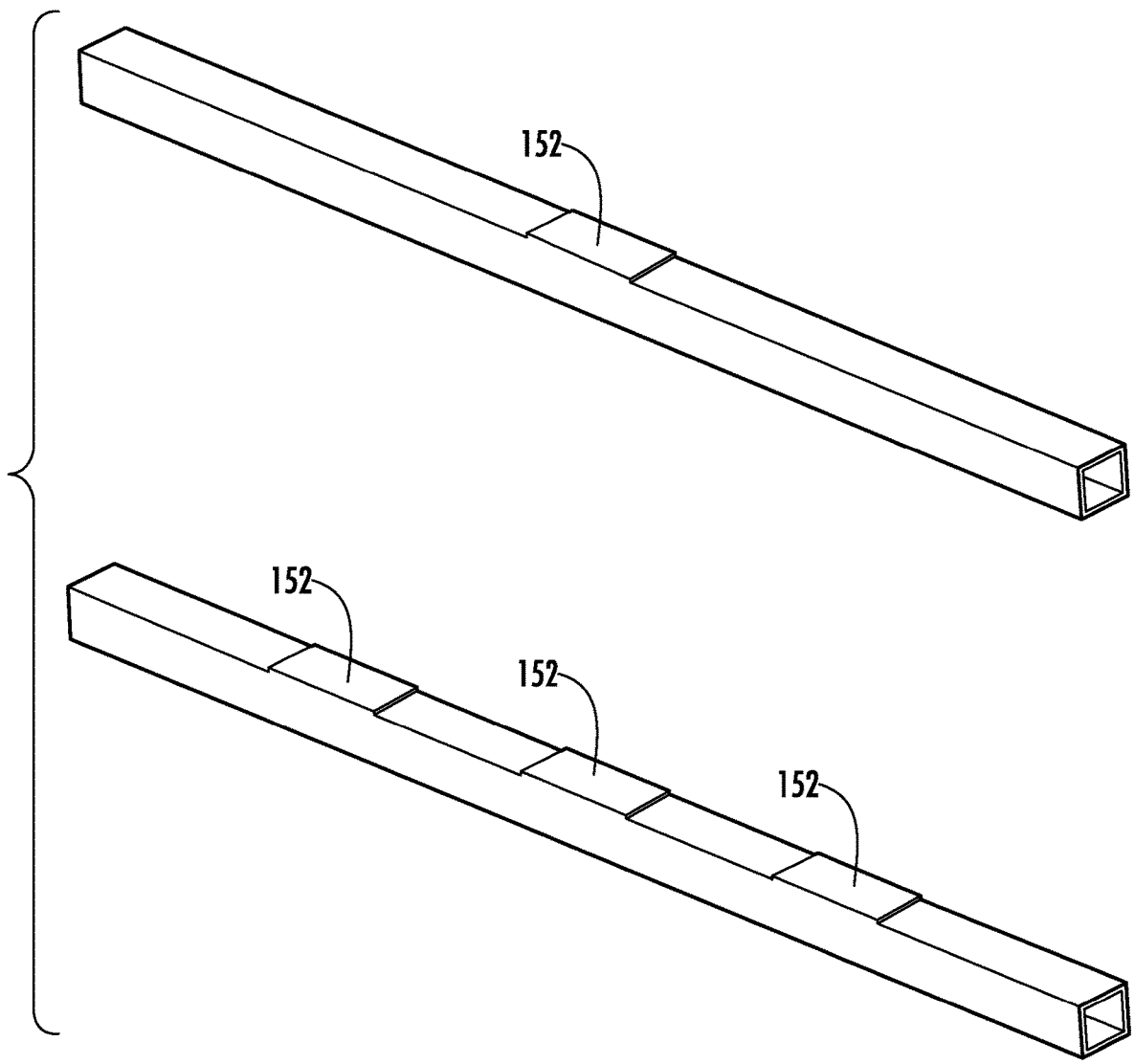
FIG. 12 shows perspective views of two exemplary embodiments of a support member.

In some embodiments, the support member comprises protrusions as described herein. The protrusions can be machined into the support beam, bonded to the support beam, or formed using another suitable process. FIG. 12 shows perspective views of two exemplary embodiments of a support member comprising protrusions 152 configured as support pads machined onto an outer surface of the support member. The support pads can reduce the surface area of the support member that is in contact with the overflow distributor and/or reduce the amount of surface area on the support member that is precision machined. For example, the surfaces of the support pads can be precision machined for contact with the overflow distributor while the remainder of the surface area of the support member can be rough machined. Additionally, or alternatively, the support pads can be located away from joints in the support beam to avoid concentrating stresses at the joints. Additionally, or alternatively, in embodiments in which the support beam comprises a sleeve (e.g., as shown in FIGS. 7-8 and 10) the support pads can serve as spacers such that upper surfaces of the support pads are aligned and/or substantially coplanar with an upper surface of the sleeve (e.g., to fill a gap between the unsleeved portions of the support member and the overflow distributor).

Figure 13:
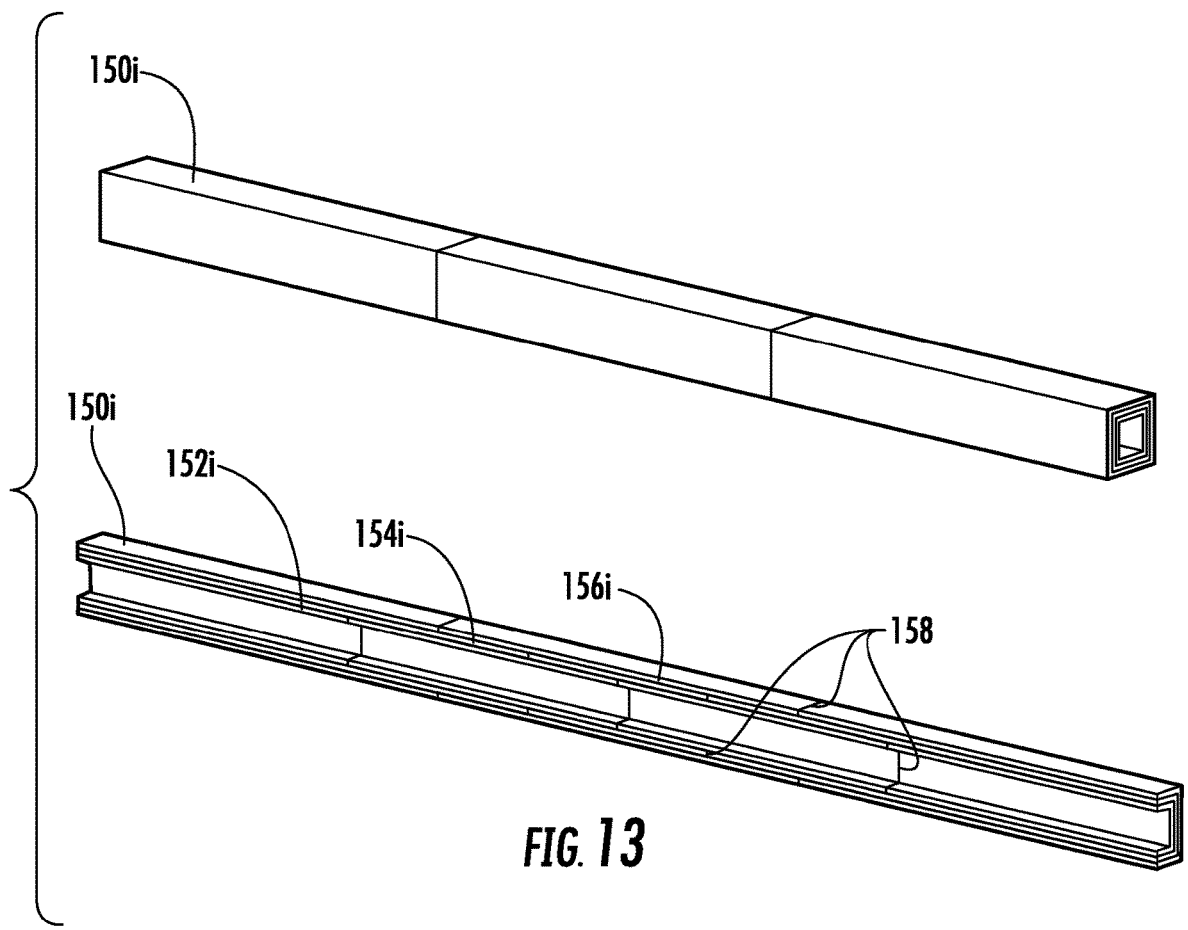
FIG. 13 shows perspective and cross-sectional views of one exemplary embodiment of a support member.

FIG. 13 shows perspective and cross-sectional views of an exemplary embodiment of a support member 150*i* comprising a plurality of beam layers. For example, in the embodiment shown in FIG. 13, the support member comprises an inner beam layer 152*i*, an outer beam layer 156*i*, and an intermediate beam layer 154*i* disposed between the inner beam layer and the outer beam layer. Each beam layer comprises a plurality of beam segments or beam sleeves as described herein. Joints 158 between adjacent beam segments or beam sleeves of one layer are misaligned with joints of adjacent beam segments or beam sleeves of another layer. Staggering the joints between the beam segments or beam sleeves can help to avoid weak areas along the length of the support member.

Although the embodiment shown in FIG. 13 comprises three beam layers, other embodiments are included in this disclosure. In other embodiments, the support member comprises a determined number of beam layers (e.g., two, four, or more).

Figure 14:
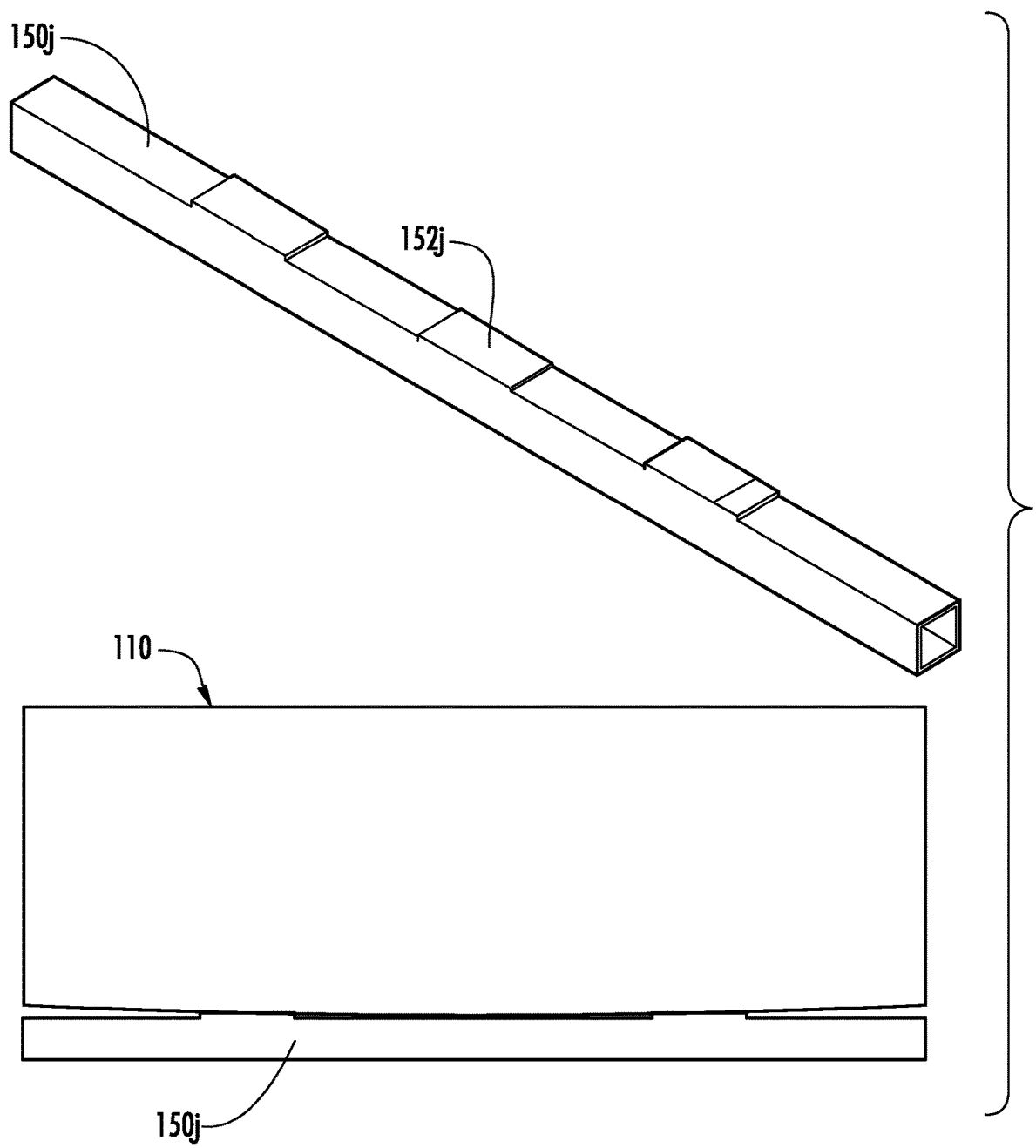
FIG. 14 shows a perspective view of an exemplary embodiment of a support member and a schematic view of the support member contacting an overflow distributor.

FIG. 14 shows a perspective view of an exemplary embodiment of a support member 150*j* comprising support pads 152*j* and a schematic view of the support member contacting an overflow distributor. The support pads can be machined such that a transverse profile of support surfaces of the support pads fits a predicted contour of the overflow distributor after a determined degree of deformation. For example, the transverse profile of the support pads can form an arc configured to support the overflow distributor as it begins to sag.

Figure 15:
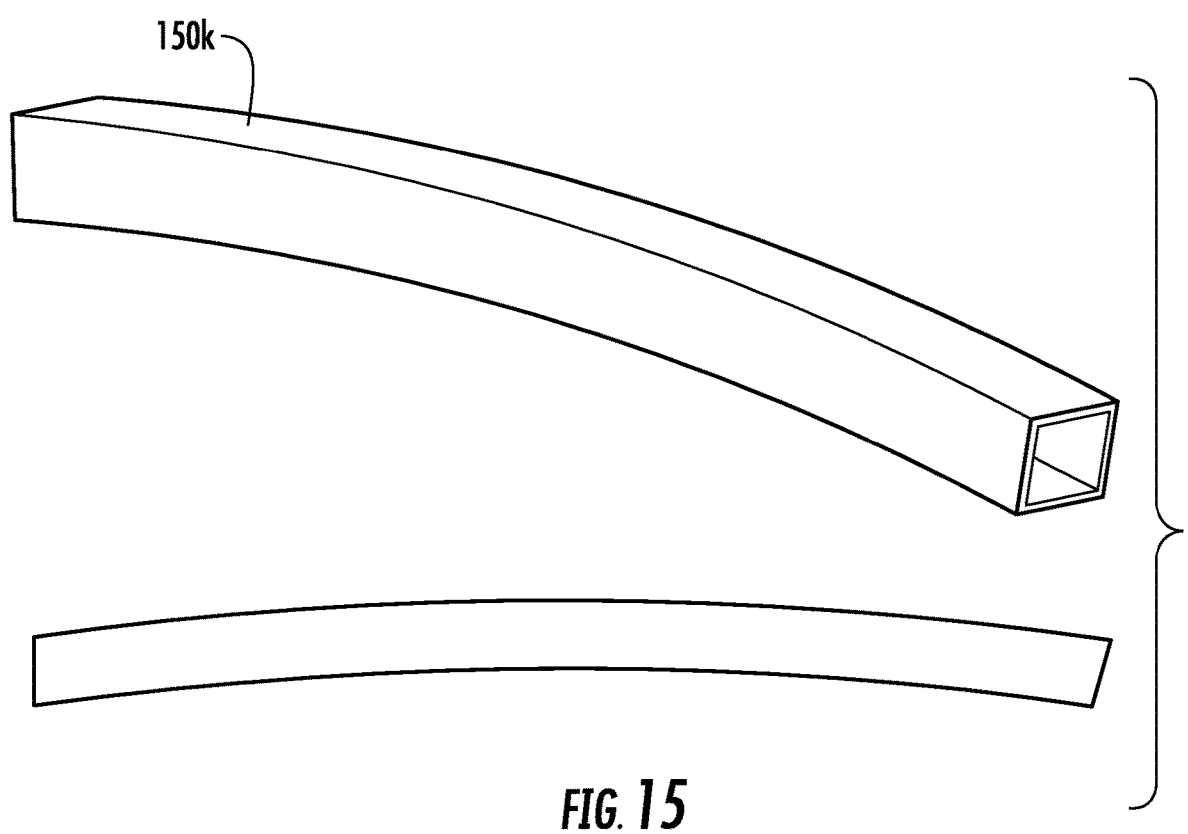
FIG. 15 shows perspective and schematic views of one exemplary embodiment of a support member.

FIG. 15 shows a perspective view and a schematic view of an exemplary embodiment of a support member 150*k* comprising a camber. For example, the support member is curved in the transverse direction. Such a curved support member can help to provide uniform support to the overflow distributor and/or further reduce sagging of the support member during use.

Figure 16:
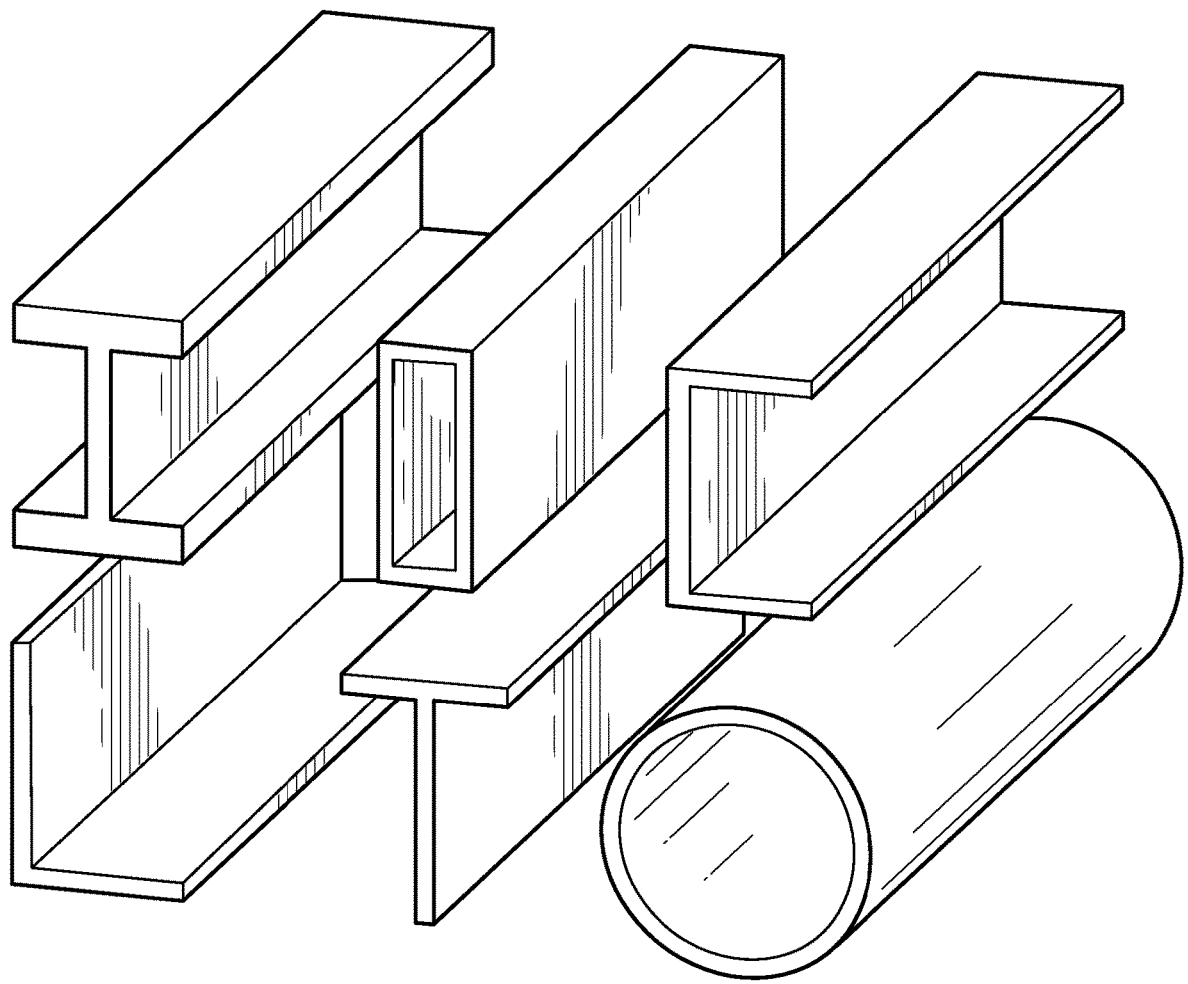
FIG. 16 shows cross-sectional views of six exemplary embodiments of a support member.

FIG. 16 shows cross-sectional views of six exemplary support members including I-shaped, rectangular, C-shaped, L-shaped, T-shaped, and circular.

In some embodiments, the support member comprises a lumen extending therein (e.g., a hollow beam). In some of such embodiments, the support member comprises a filler within the lumen. For example, the filler comprises a structured filler (e.g., a honeycomb) or an unstructured filler (e.g., a foam). The filler material can comprise the same material as the outer surface of the support member or a different material. For example, in some embodiments, the filler material comprises a refractory material.

An exemplary process for forming a glass article using a laminate fusion draw process will be described with reference to FIGS. 1-2. A first glass composition is melted and fed into trough 138 of second overflow distributor 130 in a viscous state. The first glass composition will form a core layer of the glass article as described herein. A second glass composition is melted and fed into trough 118 of first overflow distributor 110 in a viscous state. The second glass composition will form first and second cladding layers of the glass article as described herein.

The first glass composition overflows trough 138 and flows down the exterior surfaces of opposing first and second sidewalls 132 and 134 and down first and second forming surfaces 144 and 146 of second overflow distributor 130. The separate streams of the first glass composition flowing down respective first and second outer forming surfaces 144 and 146 converge at draw line 148 where they are fused together to form the core layer of the glass article.

The second glass composition overflows trough 118 and flows down the exterior surfaces of opposing first and second sidewalls 112 and 114 of first overflow distributor 110. The second glass composition contacts the first glass composition flowing over first and second sidewalls 132 and 134 of second overflow distributor 130. The separate streams of the second glass composition are fused to the respective separate streams of the first glass composition flowing down respective first and second forming surfaces 144 and 146 of second overflow distributor 130. Upon convergence of the streams of the first glass composition at draw line 148, the second glass composition forms the first and second cladding layers of the glass article.

Figure 17:
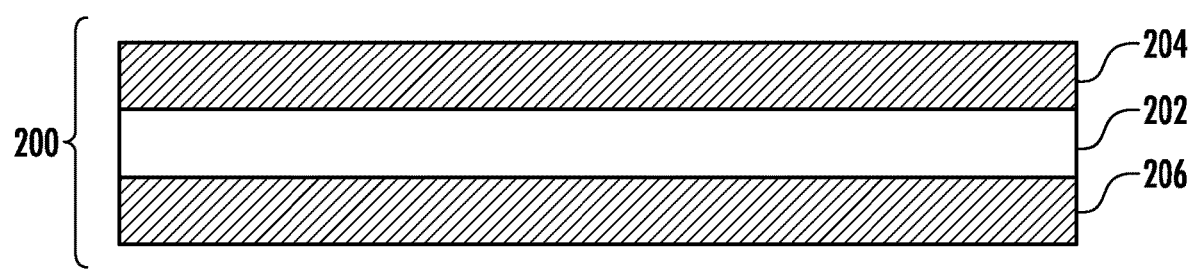
FIG. 17 is a schematic cross-sectional view of one exemplary embodiment of a glass article.

FIG. 17 is a cross-sectional view of one exemplary embodiment of a glass article 200 that can be formed using system 100 as described herein. In some embodiments, glass article 100 comprises a laminated sheet comprising a plurality of glass layers. The laminated sheet can be substantially planar as shown in FIG. 17 or non-planar. Glass article 200 comprises a core layer 202 disposed between a first cladding layer 204 and a second cladding layer 206. In some embodiments, first cladding layer 204 and second cladding layer 206 are exterior layers as shown in FIG. 17. In other embodiments, the first cladding layer and/or the second cladding layer are intermediate layers disposed between the core layer and an exterior layer.

Core layer 202 comprises a first major surface and a second major surface opposite the first major surface. In some embodiments, first cladding layer 204 is fused to the first major surface of core layer 202. Additionally, or alternatively, second cladding layer 206 is fused to the second major surface of core layer 202. In such embodiments, the interfaces between first cladding layer 204 and core layer 202 and/or between second cladding layer 206 and core layer 202 are free of any bonding material such as, for example, an adhesive, a coating layer, or any non-glass material added or configured to adhere the respective cladding layers to the core layer. Thus, first cladding layer 204 and/or second cladding layer 206 are fused directly to core layer 202 or are directly adjacent to core layer 202. In some embodiments, the glass article comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer. In some embodiments, glass article 200 comprises a glass-glass laminate in which the interfaces between directly adjacent glass layers are glass-glass interfaces.

In some embodiments, core layer 202 comprises the first glass composition, and first and/or second cladding layers 204 and 206 comprise the second glass composition that is different than the first glass composition. For example, in the embodiment shown in FIG. 17, core layer 202 comprises the first glass composition, and each of first cladding layer 204 and second cladding layer 206 comprises the second glass composition. In other embodiments, the first cladding layer comprises the second glass composition, and the second cladding layer comprises a third glass composition that is different than the first glass composition and/or the second glass composition.

EXAMPLES

The embodiments described herein will be further clarified by the following examples.

Example 1

Figure 18:
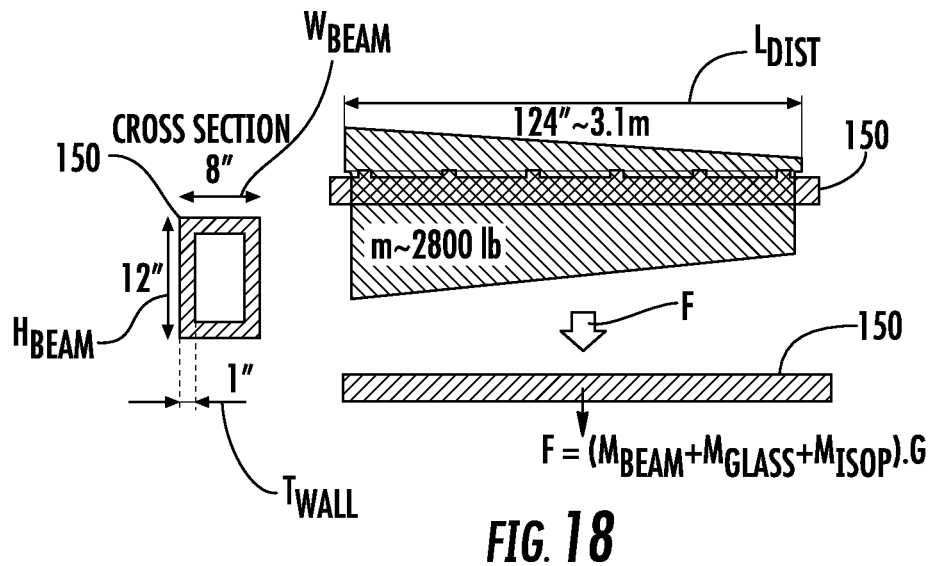
FIG. 18 is a schematic view of one exemplary embodiment of an overflow distributor and support member used for numerical simulation.

Numerical simulations were performed to estimate the deformation of an overflow distributor configured generally as described herein with reference to first overflow distributor 110 and an α-SiC support member configured generally as described herein with reference to support member 150. The configuration and dimensions of the overflow distributor and the support member, as well as support member cross-section and force diagram pull-outs, are shown in FIG. 18. The modeled overflow distributor had a mass of about 2800 lb and a length $L_{dist}$ in the transverse direction of 124 in. The modeled support member was a hollow beam with a wall thickness $t_{wall}$ of 1 in and a rectangular cross-section with a width $W_{beam}$ of 8 in and a height $h_{beam}$ of 12 in. The force F on the beam was calculated using the mass of the support member $m_{beam}$, the mass of the overflow distributor $m_{isop}$, and the predicted mass of glass contained within the trough of the overflow distributor $m_{glass}$ using the following equation: $F=(m_{beam}+m_{glass}+m_{isop})\cdot g$, where g is the force of gravity.

Figure 19:
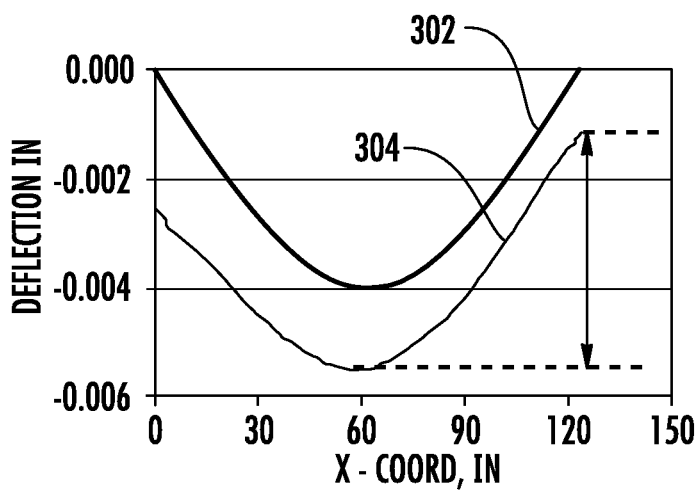
FIG. 19 is a graphical illustration showing the deflection of the overflow distributor and the support member shown in FIG. 18 as a function of transverse position after 3 years of operation at 1221° C.

FIG. 19 is a graphical illustration showing the deflection of the overflow distributor and the support member as a function of transverse position (e.g., between the opposing first and second ends of the overflow distributor) after 3 years of operation at 1221° C. Curve 302 represents deflection of the support member. Curve 304 represents deflection of the overflow distributor. As shown in FIG. 19, the maximum deflection of the overflow distributor was 0.043 in, which indicates that the overflow distributor is expected to sag near the center thereof by 0.043 in after 3 years of operation. The stress on the support member was about 7.4 Mpa, which corresponds to an expected lifetime of greater than 100 years.

Comparative Example 1

Numerical simulations were performed to estimate the deformation of an overflow distributor configured generally as described herein with reference to first overflow distributor 110 and a conventional compression system. The compression system was positioned about 13 in above the lower edge of the overflow distributor.

Figure 20:
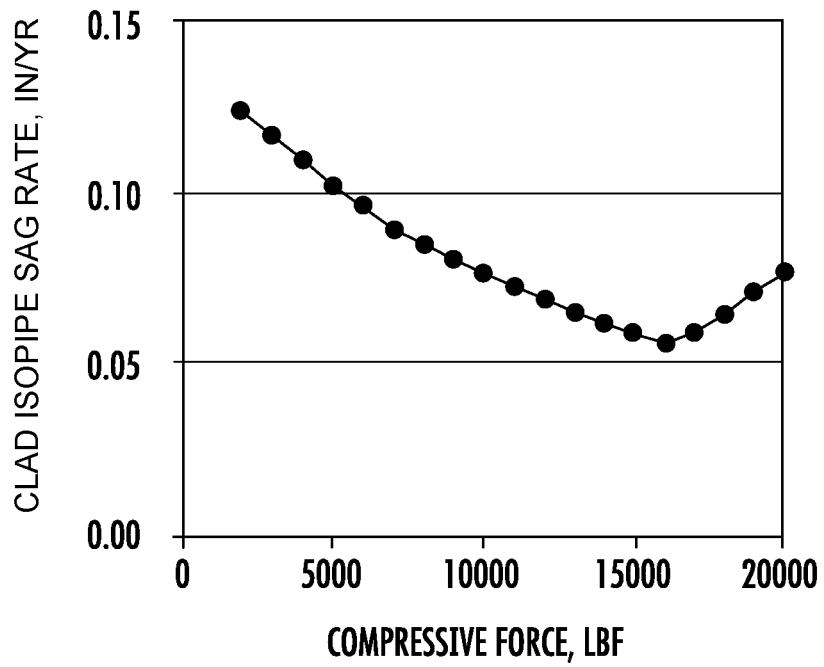
FIG. 20 is a graphical illustration showing the sag rate of one exemplary overflow distributor with a compression system as a function compressive force.

FIG. 20 is a graphical illustration showing the sag rate as a function of compressive force. As shown in FIG. 20, the lowest sag rate achieved was 0.05 in/yr at a compressive force of about 16,000 $lb_f$.

Figure 21:
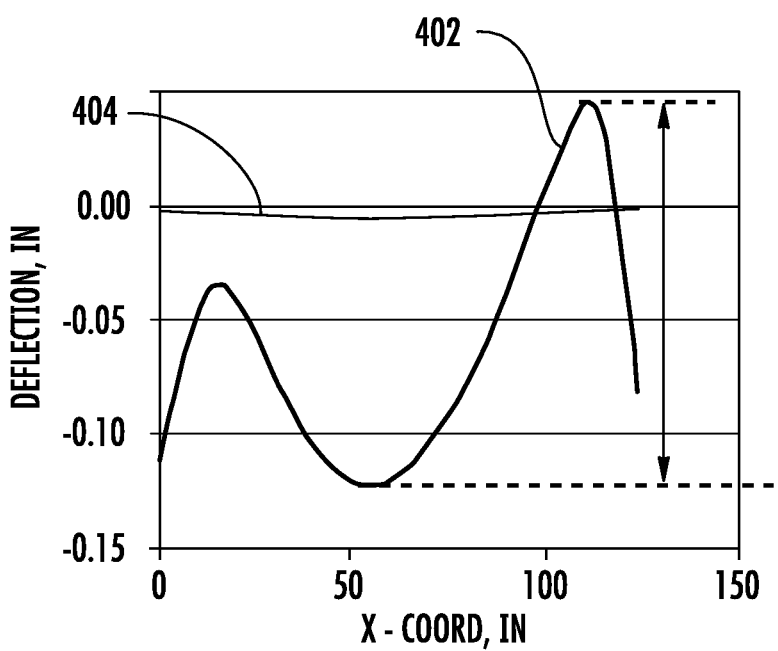
FIG. 21 is a graphical illustration showing the deflection of one exemplary overflow distributor with a compression system as a function of transverse position after 3 years of operation at 1221° C.

FIG. 21 is a graphical illustration showing the deflection of the overflow distributor as a function of transverse position (e.g., between the opposing first and second ends of the overflow distributor) after 3 years of operation at 1221° C. Curve 402 represents deflection of the overflow distributor. Curve 404 represents deflection of the support member from Example 1 for comparison. As shown in FIG. 21, the maximum deflection of the overflow distributor was about 0.15 in, which is about 30 times higher than the maximum deflection determined in Example 1. Thus, the numerical simulations suggest that the support member described herein is capable of providing a reduced sag rate compared to the conventional compression system.

It will be apparent to those skilled in the art that various modifications and variations can be made without departing from the spirit or scope of the invention. Accordingly, the invention is not to be restricted except in light of the attached claims and their equivalents.

What is claimed is:

1. A system comprising:
a first overflow distributor comprising a first sidewall, a second sidewall parallel and opposite the first sidewall, and a floor extending between the opposing first and second sidewalls, interior surfaces of the first sidewall and the second sidewall, and a top surface of the floor cooperatively defining a trough configured to receive molten glass, exterior surfaces of the first sidewall and the second sidewall configured to direct molten glass that overflows the trough, interior surfaces of the first sidewall and the second sidewall and a bottom surface of the floor cooperatively defining a cavity, wherein portions of the interior surfaces of the first and second sidewalls that define the cavity extend parallel to one another beneath the bottom surface of the floor; and
a support member disposed within the cavity and abutting the bottom surface of the floor of the first overflow distributor; and
a second overflow distributor arranged below the first overflow distributor.

2. The system of claim 1, wherein the support member comprises α-SiC.

3. The system of claim 2, wherein the support member is free of a platinum cladding.

4. The system of claim 1, wherein the support member comprises a plurality of beam segments.

5. The system of claim 4, wherein the support member comprises a beam sleeve, and each of two adjacent beam segments is disposed at least partially within the beam sleeve.

6. The system of claim 5, wherein the two adjacent beam segments are joined at a joint, and the joint is disposed within the beam sleeve.

7. The system of claim 5, wherein the two adjacent beam segments are spaced from one another within the beam sleeve.

8. The system of claim 1, wherein the support member comprises a plurality of beam layers.

9. The system of claim 8, wherein each of two adjacent beam layers comprises a joint, and the joints of the adjacent beam layers are misaligned with one another.

10. The system of claim 1, wherein the support member comprises a hollow beam comprising a lumen extending therein and a filler material disposed within the lumen.

11. The system of claim 1, wherein a length of the support member is greater than a width of the overflow distributor such that opposing end portions of the support member extend in a transverse direction beyond the overflow distributor.

12. The system of claim 1, wherein the system is free of a compressive force applied in a transverse direction to opposing first and second ends of the overflow distributor.

13. A system comprising:
a first overflow distributor comprising a first sidewall, a second sidewall parallel and opposite the first sidewall, a floor disposed between the opposing first and second sidewalls, a trough disposed above a top surface of the floor and between the opposing first and second sidewalls and extending in a transverse direction within the overflow distributor, and interior surfaces of the first sidewall and the second sidewall and a bottom surface of the floor cooperatively defining a cavity disposed beneath the floor and extending in the transverse direction within the first overflow distributor, the trough and the cavity separated by the floor, wherein portions of the interior surfaces of the first and second sidewalls that define the cavity extend parallel to one another beneath the bottom surface of the floor; and
a support member disposed within the cavity; and
a second overflow distributor arranged below the first overflow distributor.

14. The system of claim 13, wherein lower portions of sidewalls of the second overflow distributor converge at a root disposed beneath the cavity.

15. The system of claim 13, wherein the support member comprises α-SiC.

16. The system of claim 13, wherein the support member is free of a cladding layer.

17. The system of claim 13, wherein the support member comprises a plurality of beam segments.

18. A system comprising:
an upper overflow distributor comprising a first sidewall, a second sidewall parallel and opposite the first sidewall, a floor disposed between the opposing first and second sidewalls, a trough disposed above a top surface of the floor and between the opposing first and second sidewalls and extending in a transverse direction within the upper overflow distributor, and a cavity disposed beneath a bottom surface of the floor and between interior surfaces of the opposing first and second sidewalls and extending in the transverse direction within the upper overflow distributor, the trough and the cavity separated by the floor, wherein portions of the interior surfaces of the first and second sidewalls that define the cavity extend parallel to one another beneath the bottom surface of the floor;
a lower overflow distributor disposed beneath the upper overflow distributor and comprising a first sidewall, a second sidewall opposite the first sidewall, and a trough disposed between the opposing first and second sidewalls and extending in the transverse direction within the lower overflow distributor, the opposing first and second sidewalls converging at a draw line disposed beneath the trough of the lower overflow distributor; and
a support member disposed within the cavity of the upper overflow distributor.

* * * * *

UNITED STATES PATENT AND TRADEMARK OFFICE
CERTIFICATE OF CORRECTION

Page 1 of 1

PATENT NO. : 10,737,962 B2
APPLICATION NO. : 15/548596
DATED : August 11, 2020
INVENTOR(S) : Frank Coppola et al.

It is certified that error appears in the above-identified patent and that said Letters Patent is hereby corrected as shown below:

On the Title Page

Page 2, in Column 2, item [56], Line 5, delete "Aug. 5, 201;" and insert -- Aug. 5, 2019; --, therefor.

Signed and Sealed this
Fifth Day of January, 2021

Andrei Iancu
*Director of the United States Patent and Trademark Office*